No. 866,278. PATENTED SEPT. 17, 1907.
M. D. HEMENWAY.
CONTROLLER FOR ROTATING SHAFTS.
APPLICATION FILED AUG. 23, 1904.
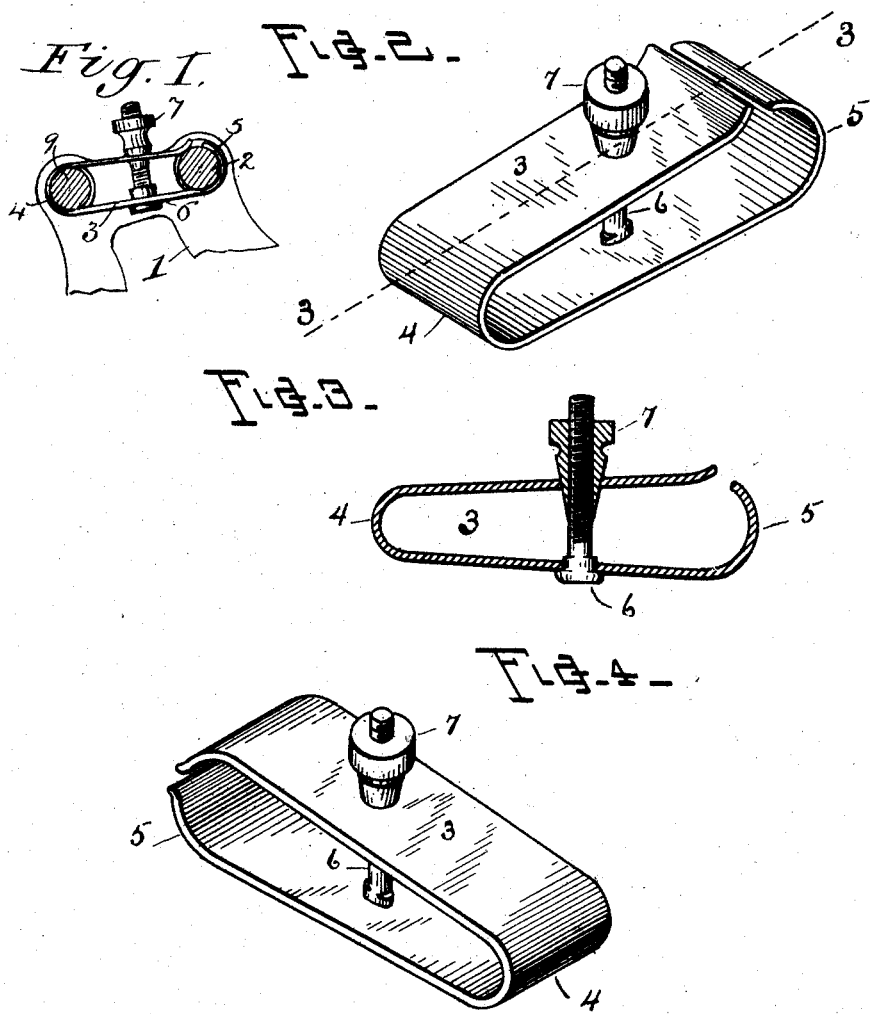

UNITED STATES PATENT OFFICE.

MELVILLE D. HEMENWAY, OF SAN FRANCISCO, CALIFORNIA.

CONTROLLER FOR ROTATING SHAFTS.

No. 866,278.

Specification of Letters Patent.

Patented Sept. 17, 1907.

Application filed August 23, 1904. Serial No. 221,896.

*To all whom it may concern:*

Be it known that I, MELVILLE D. HEMENWAY, a citizen of the United States, residing at the city and county of San Francisco and State of California, have invented certain new and useful Improvements in Controllers for Rotating Shafts, of which the following is a specification.

My invention relates to an adjustable friction clamp for controlling the rotation of a shaft.

It consists of the device and combination set forth in the claims at the end hereof.

I have designed my invention more particularly for use with an arithmometer or adding machine, but it is adapted for use with other devices.

In carrying out my invention I proceed as follows: I construct a spring in the form of a divided loop which embraces the shaft to be controlled at the point of division and is secured in place by being looped to the shaft or a screw or other convenient device at its other end. Between these two points I apply an adjusting device composed of a screw inserted through holes in the two members of the spring and provided with a thumb nut which can be tightened upon either member and thus throw the two together, causing the spring to press more tightly on the shaft to be controlled.

In the accompanying drawing I have shown my invention in connection with an arithmometer in what I consider its best form.

Figure 1, represents a fragmentary view in elevation and partly in section showing the invention applied. Fig. 2, is an enlarged perspective view showing the clamp. Fig. 3, is a longitudinal section taken on the line 3—3 of Fig. 2. Fig. 4, is a perspective view of a modified form of the clamp.

In the drawings 1, represents the frame of the machine having mounted therein a shaft 2, to be controlled by the spring or friction clamp 3. This clamp is composed of a frame base of steel bent into a loop at one end 4 and having its other ends brought together and bent so as to form a divided loop 5, the division may be either at one side as shown in Figs. 2 and 3 or at the end as in Fig. 4; 6 is a screw inserted through holes in the body of the spring between the two loops and provided with a set nut 7, by turning which the two members of the spring may be drawn together or released thus increasing or diminishing the friction upon the shaft 2.

The nut may be of ordinary pattern, yet I prefer the style shown particularly in Fig. 3, which is provided with downward cone shaped end fitting into the aperture made in one of the members of the spring for the screw 6, thus creating considerable friction on the nut which has the tendency of preventing the loosening of the same when adjusted in position.

In order to prevent the spring from rotating with the shaft I have secured the end of it opposite to the shaft; to wit, the loop 4, to the frame of the machine by means of the bolt 9.

Prior to my invention friction was applied to the shaft to be controlled by means of a frame spring pressing against one side of the shaft. This spring, of course, pressed the shaft against the opposite side of its bearing and resulted in wear of the bearing. With my device the pressure is applied on both sides of the shaft uniformly and there is no tendency to force the shaft against either side of its bearing and consequently there is no wear due to the use of the controlling device.

Having thus described an embodiment of my invention what I desire to secure by Letters Patent is.

A controlling or tension device for a shaft consisting of a frame, a spring bent into a double loop, one end of which embraces the shaft and the other is secured to a fixed point on the frame, in combination with a screw extending through the body of the spring and engaging a cone-shaped nut, said nut passing through a portion of the spring.

In testimony whereof I have affixed my signature in presence of subscribing witnesses this 17th day of August 1904.

MELVILLE D. HEMENWAY.

Witnesses:
W. F. FISHER,
A. S. PARÉ.